(12) United States Patent
Young

(10) Patent No.: US 7,806,484 B1
(45) Date of Patent: Oct. 5, 2010

(54) REMOVABLE WHEEL PROTECTOR APPARATUS

(76) Inventor: Roy K. Young, P.O. Box 217, Hilsboro, AL (US) 35643

( * ) Notice: Subject to any disclaimer, the term of this patent is extended or adjusted under 35 U.S.C. 154(b) by 100 days.

(21) Appl. No.: 12/272,925

(22) Filed: Nov. 18, 2008

(51) Int. Cl.
*B60B 7/06* (2006.01)

(52) U.S. Cl. .............................. 301/37.104; 301/37.12; 301/37.31

(58) Field of Classification Search ............ 301/37.103, 301/37.104, 37.12, 37.31, 37.34, 37.24, 37.32; 118/504, 505; 40/587
See application file for complete search history.

(56) References Cited

U.S. PATENT DOCUMENTS

| | | | | |
|---|---|---|---|---|
| 2,091,050 A * | 8/1937 | McKechnie et al. | ........ | 29/426.6 |
| 2,500,221 A * | 3/1950 | Wagner | ........ | 29/245 |
| 2,627,839 A * | 2/1953 | Hudgins et al. | ........ | 118/505 |
| 3,649,069 A * | 3/1972 | Zip | ........ | 296/97.7 |
| 4,406,246 A * | 9/1983 | DeMeyer et al. | ........ | 118/505 |
| 4,811,991 A | 3/1989 | Moreno et al. | | |
| 4,874,206 A * | 10/1989 | Sampson | ........ | 301/37.103 |
| 5,435,630 A * | 7/1995 | Tucker | ........ | 301/37.103 |
| D390,181 S | 2/1998 | Morrison | | |
| 6,227,623 B1 | 5/2001 | Bellow | | |
| 6,464,303 B2 * | 10/2002 | Stembridge | ........ | 301/37.31 |
| 6,502,355 B1 * | 1/2003 | Bori | ........ | 52/202 |
| 6,585,329 B2 | 7/2003 | Crump | | |
| 6,685,276 B2 | 2/2004 | Kenion | | |
| 6,692,085 B1 | 2/2004 | Threadgill | | |
| 6,863,353 B1 * | 3/2005 | Buckner | ........ | 301/37.103 |
| 6,871,914 B2 | 3/2005 | Stewart, Jr. | | |
| 7,374,248 B1 * | 5/2008 | Clayton | ........ | 301/37.103 |
| 2007/0013226 A1 * | 1/2007 | Updegraph | ........ | 301/37.104 |

* cited by examiner

*Primary Examiner*—Russell D Stormer
(74) *Attorney, Agent, or Firm*—Crossley Patent Law; Mark A. Crossley

(57) ABSTRACT

The removable wheel protector apparatus has a round flat disc with a plurality of spaced apart covered clips affixed to the perimeter. The handle is disposed in the center of the disc. The bottom perimeter of the disc features a rubberized seal. The apparatus is pushed onto and pulled off of a wheel and removably held via the clips. The suction cup further aids in retention of the cover on the wheel. The apparatus provides a hands-free seal against invasion of any foreign substance, including water. Edges of various apparatus components are coated or rounded to ensure against scratching any surface.

1 Claim, 4 Drawing Sheets

REMOVABLE WHEEL PROTECTOR APPARATUS

BACKGROUND OF THE INVENTION

There are many times when it is desirable to protect a wheel of a vehicle from foreign matter. Washing a car, for example, requires water and sometimes surfactants which a user does not wish on wheels. Some polished and painted wheels react unfavorably to various chemicals used on tires and on car paint finishes. It is established that there exists a desire to protect wheels from a host of substances. Among the solutions provided to this problem, there are a variety of approaches. Some are relatively complex, which entails inconvenience in use and also adds expense to production and sale of the devices. Some proposed devices do not offer hands-free retention. Some offer convoluted surfaces not conducive to advertising. Some devices do not seal against water. The present apparatus provides for hands free use, once pushed on to a wheel. The apparatus provides scratch-free retention on the wheel, with instant on-off application.

The apparatus is lightweight, inexpensively produced, easily used, long lived, one-piece, and provides no moving parts. The apparatus further completely seals against invasion of any unwanted substance, including water and chemicals, and also provides a large surface for advertising.

FIELD OF THE INVENTION

The removable wheel protector apparatus relates to masking devices and more especially to a removable wheel protector for guarding and sealing wheels against various undesirable foreign substances.

SUMMARY OF THE INVENTION

The general purpose of the removable wheel protector apparatus, described subsequently in greater detail, is to provide a removable wheel protector apparatus which has many novel features that result in an improved removable wheel protector apparatus which is not anticipated, rendered obvious, suggested, or even implied by prior art, either alone or in combination thereof.

To attain this, the removable wheel protector apparatus provides for instant on/off use and is provided in a variety of wheel diameter sizes. The apparatus is ideally made of synthetic materials such as plastics and rubberized components. Each clip is surrounded by a cover of rubberized or like material to prevent scratching of any surface, whether a wheel or even any surface of a vehicle which the apparatus might inadvertently contact. The clip bends are angled, in various embodiments, from 90 up to 110 degrees to guarantee retention until the user chooses to pull the apparatus off, which is simply a reversal of the push-on use. The optional suction cup further aids in retention to a wheel. This feature also guarantees fit, depending upon the clip bend angles of the embodiment, to specific styles of wheels. Ideally, the disc features 8 clips spread equally apart in the 360 degree perimeter. Other embodiments are provided with fewer clips. The ease of use, durability, and inexpensive production and sale provides for commercial use in multiples, for automotive detail shops and other such users.

The round flat disc provides an excellent surface for logos and advertising, for various manufacturers to announce their products, including those who make tire treatments.

Thus has been broadly outlined the more important features of the improved removable wheel protector apparatus so that the detailed description thereof that follows may be better understood and in order that the present contribution to the art may be better appreciated.

An object of the removable wheel protector apparatus is to shield and seal a wheel against dirt, moisture and solutions.

Another object of the removable wheel protector apparatus is to provide for self-retention of the apparatus to a wheel.

A further object of the removable wheel protector apparatus is to shield a wheel without the need for adjustable mechanisms in application or removal of the apparatus.

An added object of the removable wheel protector apparatus is to be convenient and inexpensive.

Another object of the removable wheel protector apparatus is to ensure against scratching any surface.

Still another object of the removable wheel protector apparatus is to provide a large flat surface conducive to advertising.

These together with additional objects, features and advantages of the improved removable wheel protector apparatus will be readily apparent to those of ordinary skill in the art upon reading the following detailed description of presently preferred, but nonetheless illustrative, embodiments of the improved removable wheel protector apparatus when taken in conjunction with the accompanying drawings.

In this respect, before explaining the current embodiments of the improved removable wheel protector apparatus in detail, it is to be understood that the removable wheel protector apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved removable wheel protector apparatus.

It is therefore important that the claims be regarded as including such equivalent constructions insofar as they do not depart from the spirit and scope of the removable wheel protector apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 5 thereof, the principles and concepts of the removable wheel protector apparatus generally designated by the reference number 10 will be described.

Figure 1:
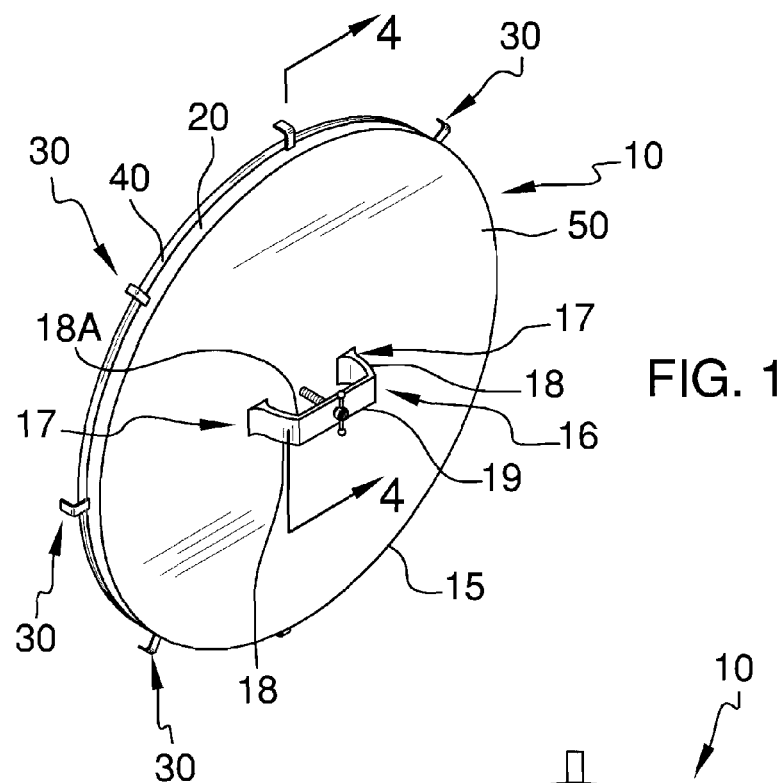
FIG. 1 is a top perspective view.
Figure 2:
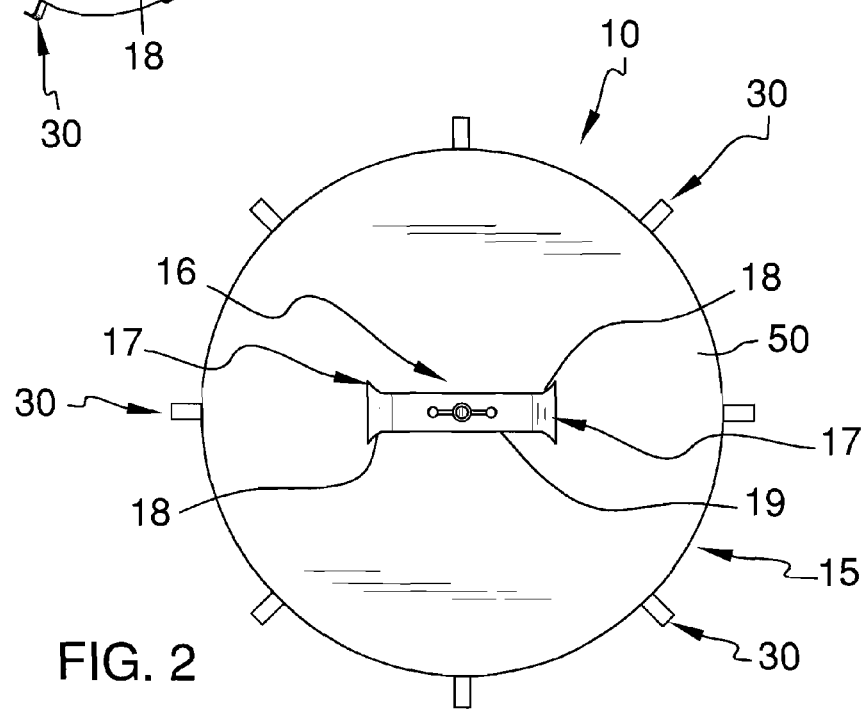
FIG. 2 is a top plan view.
Figure 3:
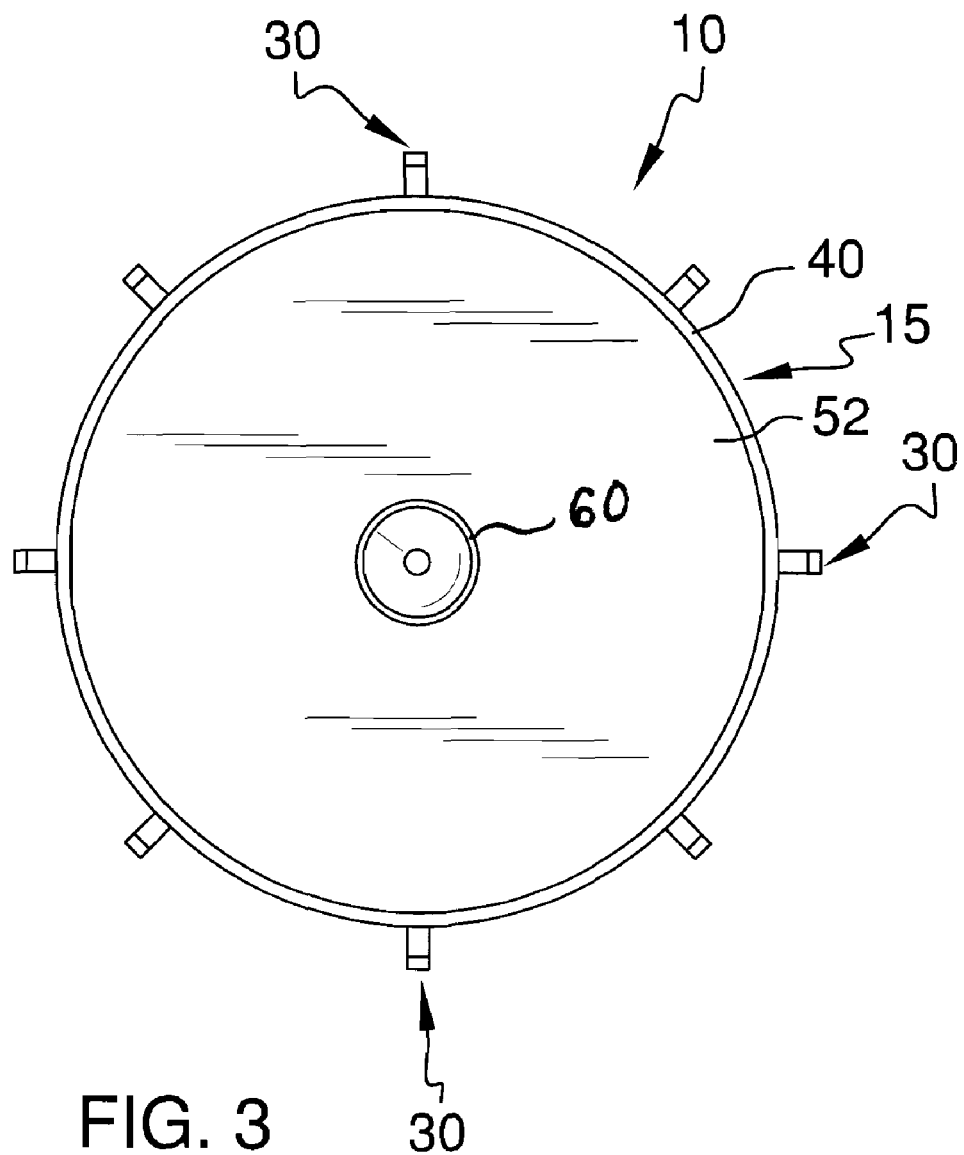
FIG. 3 is a bottom plan view.
Figure 4:
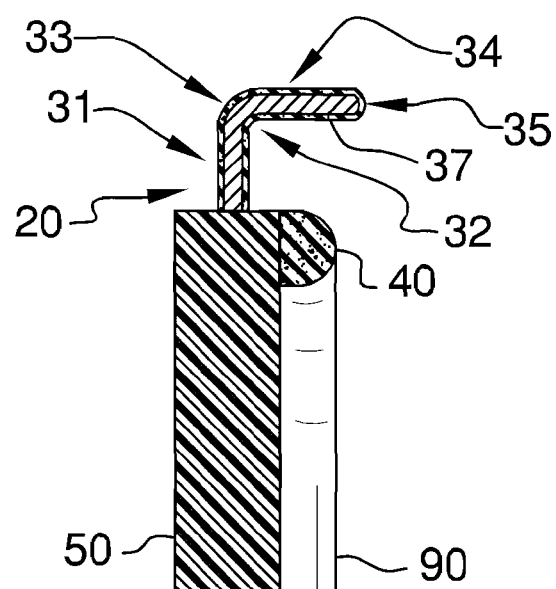
FIG. 4 is a partial cross sectional view of FIG. 1.
Figure 4:
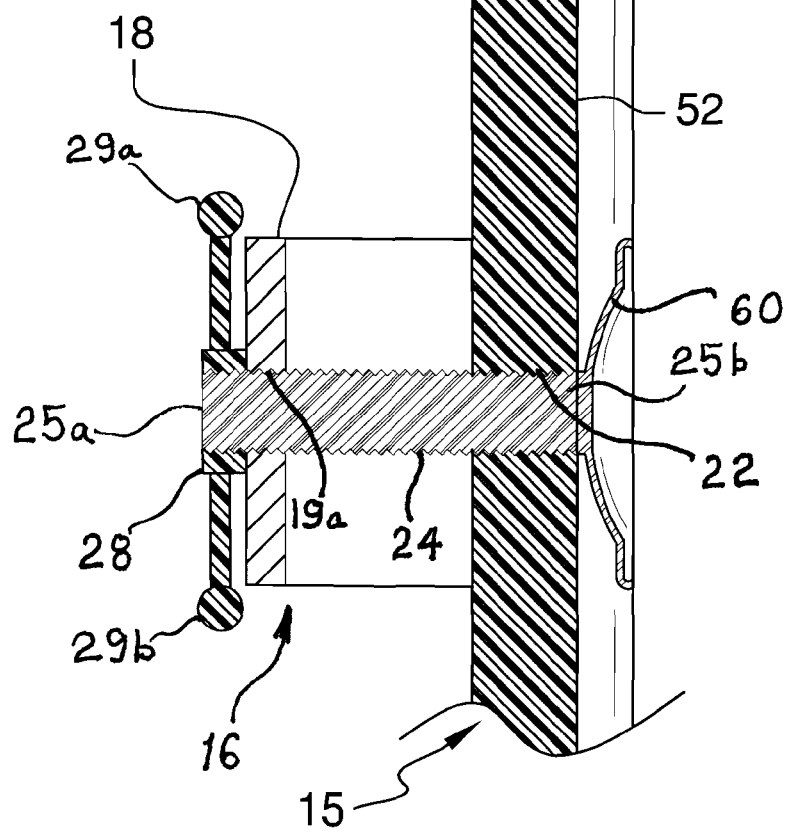
Figure 5:
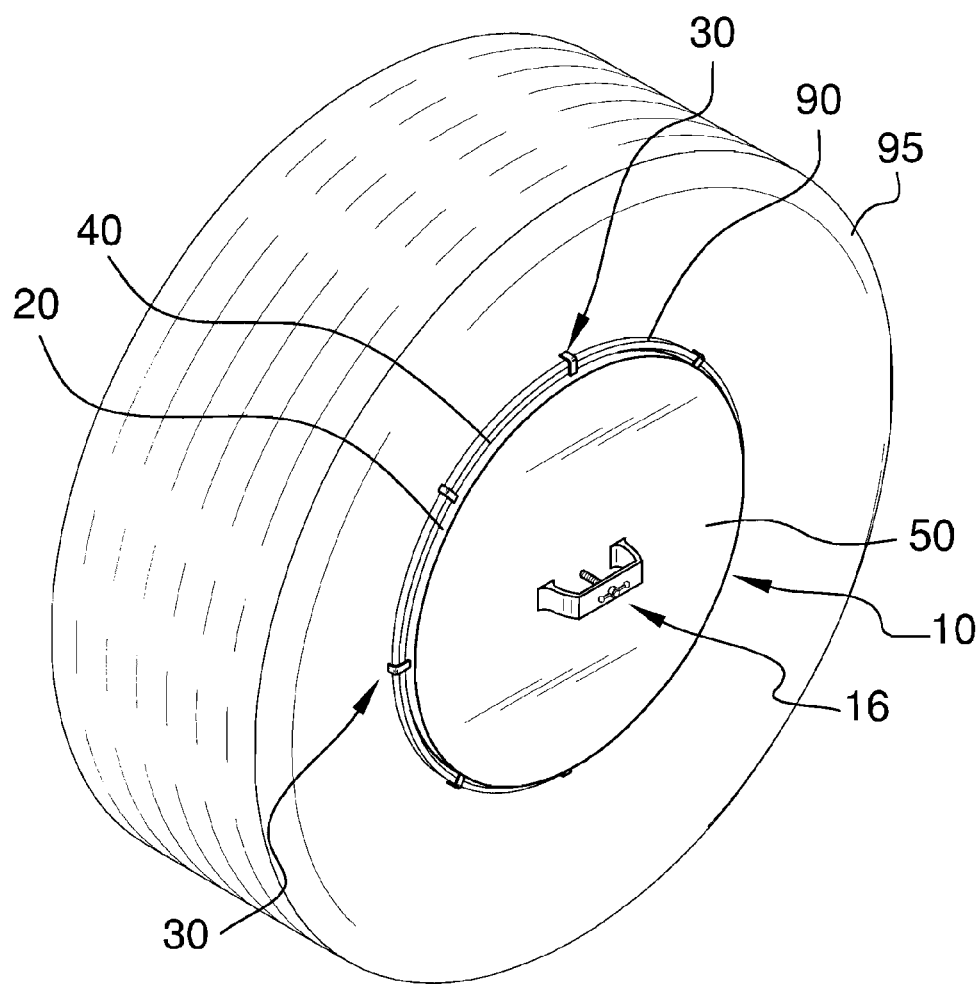
FIG. 5 is a perspective view of the apparatus installed on a wheel with tire.

Referring to FIG. 5, the removable wheel protector apparatus 10 is removably applied to an existing wheel 90 which is mounted to an existing tire 95. The apparatus 10 is provided in various wheel sizes, for example 13-20 inch wheel 90 diameters, and is not limited to these or to diameters smaller or larger. The apparatus 10 is pushed onto the wheel 90 and pulled off of the wheel 90 via the handle 16. The clips 30 provide the grip necessary for the seal 40 on the bottom perimeter 20 to seal the wheel 90 against any invasion of dirt, moisture, chemical sprays, paint, solutions, or any other substance which would otherwise reach the wheel 90.

Referring to FIGS. 1-4, the apparatus 10 comprises the round disc 15 having a top 50, a bottom 52, and an outer perimeter 20. The plurality of spaced apart clips 30 is affixed to the perimeter 20. Each clip 30 comprises a perpendicular projection 31 from the perimeter 20. The bend 32 in the projection 31 is at least 90 degrees. The bend 32 is provided, in various embodiments, in up to 110 degrees, in order to better grip various wheels 90. The rounded corner 33 of the bend 32 serves more than one important purpose. First, the rounded corner 33 negates an abrupt bend 32 edge which, with plastics and other materials, can be the source of a crack or break. Second, the rounded corner 33 prevents catching an edge on cleaning materials, skin, or scratching a vehicle's surface if inadvertently moved against the surface. The tang 34 is projected from the bend 32 and ends in a rounded end 35. The rounded end 35 is important for one of the same reasons as the rounded corner 33, that is, not catching an edge or scratching a surface.

Each clip 30 further insures against scratching via the cover 37 fully surrounding each clip 30. The handle 16 is extended from the center of the top 50 of the disc 15 via the spaced apart angled uprights 18. A flared juncture 17 joins each upright 18 of the handle 16 to the disc 15. Each flared juncture 17 adds important strength to the juncture 17 of disc 15 and uprights 18 and prevents failure at that point which might otherwise result in repeated or rough use of the apparatus 10. The grasp 19 of the handle 16 is affixed between the uprights 18 and is disposed parallel to the disc 15. The grasp 19 joins each upright 18 via a smooth transition 18a, again an important feature for strength of the handle 16 and a scratch preventative measure as listed above. The cushioned seal 40 is disposed around the bottom 52 perimeter 20 of the disc 15. The cushioned seal 40 is made of various applicable materials such as foam rubber or the like. The seal 40 is held firmly against the wheel 90 by the clips 30 to provide a positive barrier against any substance which might dirty, smear, stain, harm, or tarnish the wheel 90.

Referring again to FIG. 4, a female thread 22 is disposed in the center of the disc 15. The grasp thread 19a is disposed in the grasp 19. The threaded stud 24 is rotateably fitted within the female thread 22 and the grasp thread 19a. The threaded stud 24 has a first end 25a spaced apart from a second end 25b. The t-handle 28 is affixed to the stud 24 first end 25a. The pair of identical knobs is affixed to the t-handle 28. The knobs comprise the first knob 29a and the second knob 29b. The suction cup 60 is affixed to the threaded stud 24 second end 25b. The suction cup 60 is selectively movably extended from the bottom 52 of the disc 15 to provide adherence to a given wheel 90.

With respect to the above description then, it is to be realized that the optimum dimensional relationships for the parts of the removable wheel protector apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the removable wheel protector apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the removable wheel protector apparatus may be used.

Therefore, the foregoing is considered as illustrative only of the principles of the removable wheel protector apparatus. Further, since numerous modifications and changes will readily occur to those skilled in the art, it is not desired to limit the removable wheel protector apparatus to the exact construction and operation shown and described, and accordingly, all suitable modifications and equivalents may be resorted to, falling within the scope of the removable wheel protector apparatus.

What is claimed is:

1. A removable wheel protector apparatus, comprising:
a round flat disc having a top, a bottom, and a perimeter;
a plurality of spaced apart covered clips affixed to the perimeter, each clip comprising:
 a perpendicular projection from the perimeter;
 a bend in the projection, said bend having a rounded corner, wherein the bend is at least 90 degrees;
 a tang projected from the bend in a direction toward the disc bottom, the tang having a rounded end;
a handle in a center of the disc, the handle further comprising:
 a pair of spaced apart angled uprights projected outwardly from the disc top, wherein a flared juncture disposed on an outer edge of each of the uprights attaches each of the uprights to the disc top;
 a grasp affixed between the uprights and disposed parallel to the disc, each upright having a smooth transition with the grasp;
a cushioned seal disposed around the bottom perimeter of the disc;
a female thread in the center of the disc;
a grasp thread in the grasp;
a threaded stud rotateably fitted within the female thread and the grasp thread, the threaded stud having a first end spaced apart from a second end;
a t-handle affixed to the stud first end;
a pair of identical knobs affixed to the t-handle;
a suction cup affixed to the threaded stud second end, the suction cup selectively extended from the bottom of the disc.

* * * * *